(12) United States Patent
Fushiki et al.

(10) Patent No.: US 9,428,180 B2
(45) Date of Patent: Aug. 30, 2016

(54) FAILURE DIAGNOSIS APPARATUS OF HYBRID VEHICLE

(71) Applicant: TOYOTA JIDOSHA KABUSHIKI KAISHA, Toyota-cho, Toyota-shi, Aichi-ken (JP)

(72) Inventors: Shunsuke Fushiki, Susono (JP); Makoto Yamazaki, Gotenba (JP); Keita Fukui, Fujinomiya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/384,042

(22) PCT Filed: Mar. 13, 2013

(86) PCT No.: PCT/IB2013/000376
§ 371 (c)(1),
(2) Date: Sep. 9, 2014

(87) PCT Pub. No.: WO2013/136159
PCT Pub. Date: Sep. 19, 2013

(65) Prior Publication Data
US 2015/0032326 A1 Jan. 29, 2015

(30) Foreign Application Priority Data

Mar. 16, 2012 (JP) ................. 2012-061036

(51) Int. Cl.
*G01M 17/00* (2006.01)
*G06F 7/00* (2006.01)
(Continued)

(52) U.S. Cl.
CPC ............. *B60W 20/50* (2013.01); *B60K 6/365* (2013.01); *B60K 6/445* (2013.01); *B60L 1/006* (2013.01); *B60L 3/0023* (2013.01); *B60L 11/02* (2013.01); *B60L 11/123* (2013.01); *B60W 50/0098* (2013.01); *F02D 41/22* (2013.01); *F02D 41/2429* (2013.01); *B60W 2050/0083* (2013.01);
(Continued)

(58) Field of Classification Search
USPC ........ 701/32.1, 29, 34, 45, 1, 22, 29.1, 31.9, 701/31.8; 702/183, 184, 185; 180/65.1, 180/65.21, 65.31, 69.6
See application file for complete search history.

(56) References Cited

U.S. PATENT DOCUMENTS 7,650,210 B2 * 1/2010 Breed .................... 701/29.1
8,463,953 B2 * 6/2013 Davis .................... G06F 13/10
710/16

(Continued)

FOREIGN PATENT DOCUMENTS

JP 2001-231106 A 8/2001
JP 2002-047991 A 2/2002
(Continued)

*Primary Examiner* — Ronnie Mancho
(74) *Attorney, Agent, or Firm* — Sughrue Mion, PLLC (57) ABSTRACT

A failure diagnosis apparatus comprises a controller that is configured to execute a failure diagnosis process of the internal combustion engine based on a predetermined diagnosis requirement. The diagnosis requirement in a case where engine-operation-electric-power supply is executed is made different from the diagnosis requirement in a case where engine-normal-operation is executed such that a failure of the internal combustion engine in the case where the engine-operation-electric-power supply is executed is less likely to be detected or the failure of the internal combustion engine is less likely to be recognized by a driver than in the case where the engine-normal operation is executed.

7 Claims, 6 Drawing Sheets

(51) Int. Cl.

| | | |
|---|---|---|
| *G06F 19/00* | (2011.01) | |
| *B60W 20/00* | (2016.01) | |
| *B60K 6/365* | (2007.10) | |
| *B60K 6/445* | (2007.10) | |
| *B60W 50/00* | (2006.01) | |
| *F02D 41/22* | (2006.01) | |
| *F02D 41/24* | (2006.01) | |
| *B60L 1/00* | (2006.01) | |
| *B60L 3/00* | (2006.01) | |
| *B60L 11/02* | (2006.01) | |
| *B60L 11/12* | (2006.01) | |
| *F02N 11/04* | (2006.01) | |

(52) U.S. Cl.
CPC  *B60W 2050/0089* (2013.01); *B60W 2510/068* (2013.01); *B60W 2510/0676* (2013.01); *F02D 2200/021* (2013.01); *F02N 11/04* (2013.01); *Y02T 10/6217* (2013.01); *Y02T 10/6239* (2013.01); *Y02T 10/7077* (2013.01); *Y10S 903/902* (2013.01)

(56) References Cited

U.S. PATENT DOCUMENTS

| | | | | |
|---|---|---|---|---|
| 2005/0273218 | A1* | 12/2005 | Breed | B60C 11/24 701/2 |
| 2006/0025897 | A1* | 2/2006 | Shostak | B60C 23/005 701/1 |
| 2007/0156312 | A1* | 7/2007 | Breed | B60C 23/007 701/31.4 |
| 2009/0043441 | A1* | 2/2009 | Breed | G06K 7/10178 701/31.9 |
| 2010/0207754 | A1* | 8/2010 | Shostak | B60C 23/041 340/450 |
| 2010/0268423 | A1* | 10/2010 | Breed | B60N 2/002 701/45 |
| 2011/0082621 | A1* | 4/2011 | Berkobin | B60L 11/1824 701/31.4 |
| 2012/0004804 | A1* | 1/2012 | Beams | G01S 5/0027 701/32.7 |
| 2012/0296567 | A1* | 11/2012 | Breed | G01C 21/26 701/468 |

FOREIGN PATENT DOCUMENTS

| | | |
|---|---|---|
| JP | 2008-247252 A | 10/2008 |
| JP | 2009-137453 A | 6/2009 |
| WO | 2013/080273 A1 | 6/2013 |

* cited by examiner

| | DIAGNOSIS ITEM | | DURING NORMAL OPERATION | DURING NORMAL ELECTRIC POWER SUPPLY | DURING EMERGENCY ELECTRIC POWER SUPPLY |
|---|---|---|---|---|---|
| A | MISFIRE DETECTION (EXHAUST) | MIL | ○ | × | × |
| | | FAILURE STORAGE | ○ | ○ | ○ |
| B | CATALYST | MIL | ○ | ○ | × |
| | | FAILURE STORAGE | ○ | ○ | ○ |
| C | EVAPORATOR | MIL | ○ | × | × |
| | | FAILURE STORAGE | ○ | × | × |
| D | A/F SENSOR (BROKEN WIRE) | MIL | ○ | × | × |
| | | FAILURE STORAGE | ○ | ○ | ○ |
| E | O₂ SENSOR (GENERAL) | MIL | ○ | × | × |
| | | FAILURE STORAGE | ○ | × | × |
| F | CSS | MIL | ○ | × | × |
| | | FAILURE STORAGE | ○ | ○ | ○ |
| G | EGR | MIL | ○ | × | × |
| | | FAILURE STORAGE | ○ | × | × |
| H | THERMOSTAT | MIL | ○ | × | × |
| | | FAILURE STORAGE | ○ | × | × |
| I | VVT | MIL | ○ | × | × |
| | | FAILURE STORAGE | ○ | ○ | ○ |
| J | ISC | MIL | ○ | × | × |
| | | FAILURE STORAGE | ○ | ○ | ○ |
| K | FUEL SYSTEM | MIL | ○ | × | × |
| | | FAILURE STORAGE | ○ | ○ | ○ |

FIG.6

FAILURE DIAGNOSIS APPARATUS OF HYBRID VEHICLE

BACKGROUND OF THE INVENTION

1. Field of the Invention

The invention relates to a failure diagnosis apparatus of a hybrid vehicle.

2. Description of Related Art

Japanese Patent Application Publication No. 2001-231106 (JP-2001-231106 A) discloses a hybrid vehicle capable of external electric power supply. The hybrid vehicle disclosed in JP-2001-231106 A is capable of generating electric power by utilizing an engine output during stop of the vehicle. In addition, the hybrid vehicle disclosed in JP-2001-231106 A is capable of transmitting the generated electric power to the outside of the vehicle.

There is proposed a technique in which a threshold value of SOC of a battery used for determining whether to start or stop an engine during external electric power supply is made different from a threshold value of SOC of the battery while the vehicle is running (see Japanese Patent Application Publication No. 2008-247252 (JP-2008-247252 A)).

In addition, there is also proposed a technique in which, at a time that a system is activated, a failure determination and turning-on of an alarm lamp are performed after a time required for an abnormality determination by an engine electronic control unit (ECU) and a time required for communication with a hybrid ECU elapse (see Japanese Patent Application Publication No. 2009-137453 (JP-2009-137453 A)).

Further, there is also proposed a technique in which a failure determination of an engine is performed based on the state of electric power generation of a motor generator (see Japanese Patent Application Publication No. 2002-047991 (JP-2002-047991 A)).

A vehicle includes a failure diagnosis system. The vehicle has an internal combustion engine mounted thereon. The failure diagnosis system diagnoses the failure of each portion of the internal combustion engine. The failure diagnosis system diagnoses the failure state in a failure diagnosis target based on various diagnosis conditions corresponding to the failure diagnosis targets. However, the failure diagnosis system of a related art is constructed on the assumption of the normal running of the internal combustion engine. Consequently, the failure diagnosis system of the related art does not respond to a change in the use of the internal combustion engine resulting from technological advancement in recent years. The change in the use of the internal combustion engine includes supply of electric power generated by utilizing the power of the internal combustion engine to the outside.

When the internal combustion engine is operated in order to cause a generator to generate electric power, the operation state of the internal combustion engine is different from that during normal running in many cases. For example, the vehicle is stopped during external electric power supply. However, even during the external electric power supply, the load of the internal combustion engine is changed according to the requested amount of the generated electric power. This is because the internal combustion engine is operated in order to drive the generator. Accordingly, if no countermeasure is taken, when the external electric power supply is to be executed in such a hybrid vehicle, there is a possibility that the failure diagnosis system makes an erroneous determination. The erroneous determination is a determination that the internal combustion engine has a failure.

At this point, in a case where any failure is detected, the operation of the internal combustion engine is stopped depending on the location of the failure. Alternatively, measures such as restricting the operation of the internal combustion engine and the like are often taken. Therefore, the failure diagnosis with low accuracy can be a factor that restricts opportunity for the external electric power supply. In addition, in many vehicles, when the failure is detected, a driver is notified of the detection of the failure by turning on a lamp or an indicator. The lamp and the indicator are disposed in an information display or the like in the vehicle. In the vehicle that notifies the driver of the detection of the failure, even when the operation of the internal combustion engine is not stopped or restricted, it is sufficiently conceivable that the driver may stop the internal combustion engine based on his or her decision. With this, the external electric power supply is stopped. In addition, a failure history is often stored in various computer devices that control the vehicle. The storage of the failure detection history based on an inaccurate failure diagnosis is not desirable for the owner of the vehicle.

SUMMARY OF THE INVENTION

The invention provides a failure diagnosis apparatus of a hybrid vehicle capable of achieving cooperation between external electric power supply and a failure diagnosis.

A failure diagnosis apparatus of a hybrid vehicle of a first aspect of the invention is a failure diagnosis apparatus of a hybrid vehicle including an internal combustion engine, a rotary electric machine that is configured to generate electric power by using power of the internal combustion engine, an electric power storage device, and an electric power supply device that is configured to supply the electric power generated by the rotary electric machine and electric power stored in the electric power storage device to power receiving equipment outside the vehicle, this apparatus including a controller that is configured to execute a failure diagnosis process of the internal combustion engine based on a predetermined diagnosis requirement, wherein the diagnosis requirement in a case where engine-operation-electric-power supply in which the internal combustion engine is operated to cause the rotary electric machine to generate electric power and the generated electric power is supplied to the power receiving equipment via the electric power supply device is executed is made different from the diagnosis requirement in a case where engine-normal-operation in which the internal combustion engine is operated but the rotary electric machine does not generate the electric power to be supplied to the power receiving equipment is executed such that a failure of the internal combustion engine in the case where engine-operation-electric-power supply is executed is less likely to be detected or the failure of the internal combustion engine is less likely to be recognized by a driver than in the case where the engine-normal operation is executed.

Consequently, it is possible to prevent a situation in which a system side forcibly stops the internal combustion engine based on an erroneous diagnosis. Alternatively, it is possible to prevent a situation in which a driver stops the internal combustion engine due to his or her anxiety based on the erroneous diagnosis. Alternatively, in a case where there is no problem in continuing the external electric power supply in spite of actual presence of an abnormality in the internal combustion engine, it is possible to continue the engine start electric power supply.

In addition, the controller of the failure diagnosis apparatus of a hybrid vehicle of the first aspect of the invention may be configured to change the diagnosis requirement at a time that the engine-operation-electric power supply is executed.

According to the above aspect, the diagnosis requirement used during the engine-operation-electric-power supply is made different from the diagnosis requirement used during a normal operation by changing the diagnosis requirement during the engine-operation-electric-power supply. Consequently, the diagnosis requirement used during the engine-operation-electric-power supply can be reliably made different from the diagnosis requirement used during the engine-operation-electric-power supply. In addition, the diagnosis requirement during the engine-operation-electric-power supply in a restricted state is changed by the controller, and setting of the reasonable diagnosis requirement having a small change frequency of the diagnosis requirement is thereby implemented.

Further, in the failure diagnosis apparatus of a hybrid vehicle of the first aspect of the invention, in a case where emergency electric power supply is requested at a time that the engine-operation-electric-power supply is executed, the controller may change the diagnosis requirement such that the failure of the internal combustion engine is less likely to be detected or the failure of the internal combustion engine is less likely to be recognized by the driver than in a case where the emergency electric power supply is not requested.

According to the above aspect, the diagnosis requirement of the internal combustion engine at a time that the emergency electric power supply is requested is further relaxed by the controller. As a result, only during the emergency electric power supply, in view of its high urgency, the internal combustion engine can be used for the drive of the rotary electric machine that generates electric power within the maximum permissible range.

Furthermore, the controller of the failure diagnosis apparatus of a hybrid vehicle of the first aspect of the invention may be configured to determine presence or absence of an execution history of the engine-operation-electric-power supply and, in a case where the execution history is present at a time that the failure diagnosis process is executed at the time of the engine-normal-operation, the controller may be configured to change the diagnosis requirement such that the failure of the internal combustion engine is less likely to be detected or the failure of the internal combustion engine is less likely to be recognized by the driver than in a case where the execution history is absent.

According to the above aspect, in the case where the execution history of the engine-operation-electric-power supply is present, the diagnosis requirement is changed similarly to the case during the engine-operation-electric-power supply. Consequently, it is possible to appropriately prevent the erroneous diagnosis, and the failure diagnosis apparatus is especially effective when the hybrid vehicle is brought into a running state subsequent to the engine-operation-electric-power supply.

Moreover, the controller of the failure diagnosis apparatus of a hybrid vehicle of the first aspect of the invention may be configured to acquire a state value indicative of a warm-up state of the internal combustion engine, to requires a learned value related to a learning process for learning a state of the internal combustion engine, and to prohibit the change of the diagnosis requirement based on the state value and the learned value in the case where the execution history is present.

According to the above aspect, the change of the diagnosis requirement at the time of the engine-normal-operation is appropriately prohibited based on the state value acquired and the learned value acquired. Consequently, it is possible to execute the failure diagnosis process in a case where the normal failure diagnosis process can be executed such as a case where the engine state is not influenced by the previous engine-operation-electric-power supply.

Additionally, in the failure diagnosis apparatus of a hybrid vehicle of the first aspect of the invention, the controller may be configured to prohibit the change of the diagnosis requirement in a case where the state value is a value corresponding to a cold state of the internal combustion engine and a difference between the learned value in the case where the execution history is absent and the acquired learned value is not more than a predetermined value.

Although the practical mode of the prohibition measure of the change of the diagnosis requirement based on the state value and the learned value is not unique, when the state value that can indicate the warm-up state such as a coolant temperature or a lubricant temperature is used, it is possible to determine whether or not the engine is in the cold state relatively precisely.

In addition, in the failure diagnosis apparatus of a hybrid vehicle of the first aspect of the invention, the controller may be configured to execute at least one of a first measure in which an execution frequency of the failure diagnosis process is reduced, a second measure in which a determination criterion for determining whether or not the internal combustion engine has the failure is relaxed, a third measure in which notification of detection of the failure of the internal combustion engine to the driver is restricted, and a fourth measure in which storage of a history of the detection of the failure of the internal combustion engine is restricted.

The change of the diagnosis requirement by the controller can have various modes. According to the above aspect, at least one of the first measure in which the execution frequency of the failure diagnosis process is reduced, the second measure in which the determination criterion for determining whether or not the failure occurs is relaxed, the third measure in which the notification of the failure to the driver is restricted, and the fourth measure in which the storage of the detected failure as a failure history is restricted.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A description will be given hereinbelow of embodiments of the invention with reference to the drawings.

Figure 1:
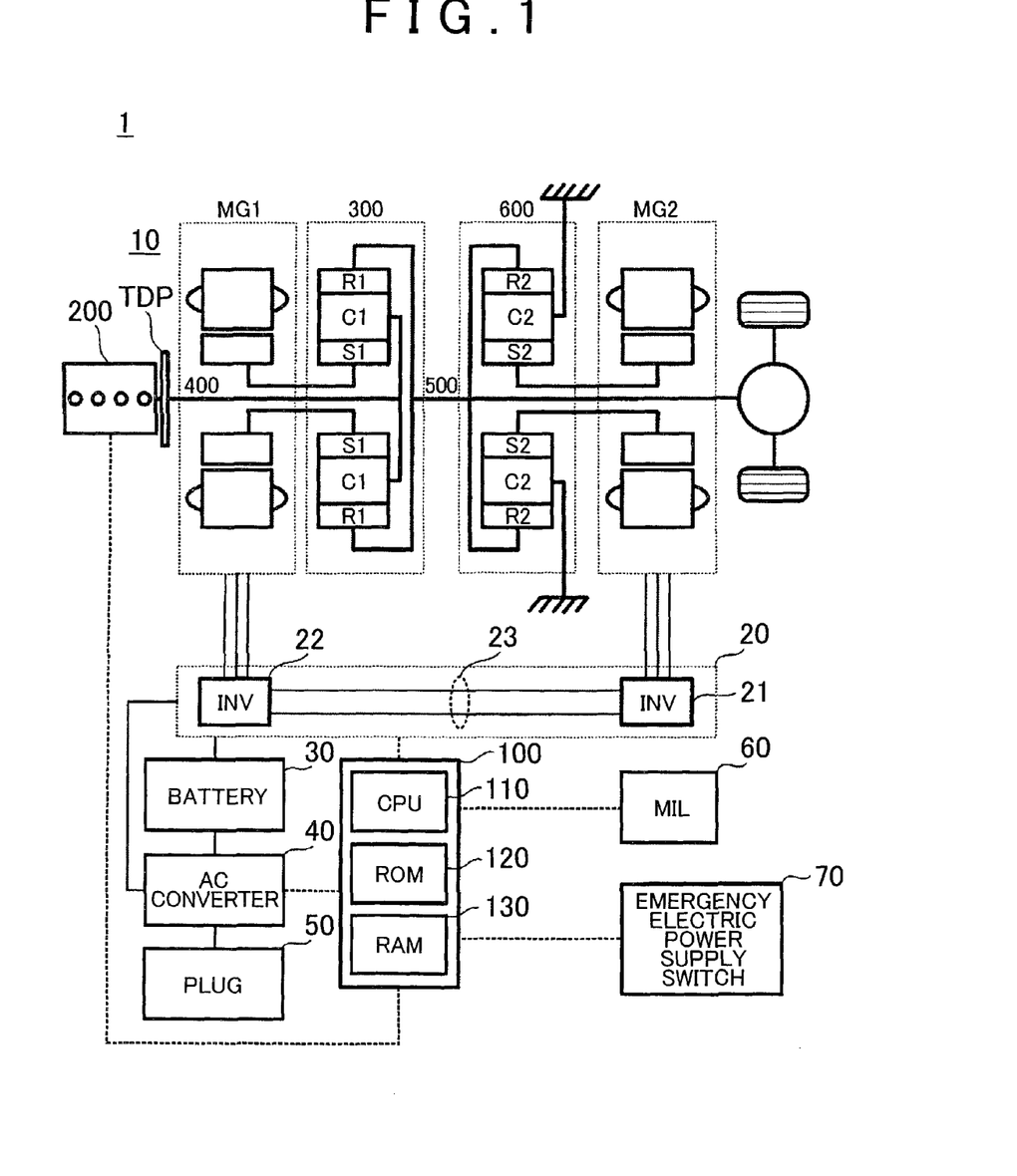
FIG. 1 is a schematic structural view conceptually showing the structure of a hybrid vehicle according to a first embodiment of the invention.

First, a description will be given of the structure of a hybrid vehicle 1 according to a first embodiment of the invention with reference to FIG. 1. FIG. 1 is a schematic structural view conceptually showing the structure of the hybrid vehicle 1.

In FIG. 1, the hybrid vehicle 1 is a plug-in hybrid vehicle. The hybrid vehicle 1 includes an ECU 100, a hybrid drive device 10, a power control unit (PCU) 20, a battery 30, an AC converter 40, a plug 50, a multi-information lamp (MIL) 60, and an emergency electric power supply switch 70. The plug-in hybrid vehicle is an example of a "hybrid vehicle" according to the invention.

The ECU 100 is an electronic control unit. The ECU 100 includes a central processing unit (CPU) 110, a read only memory (ROM) 120, and a random access memory (RAM) 130. In addition, the ECU 100 is capable of cooperatively controlling the operations of the individual portions of the hybrid vehicle 1. The ECU 100 functions as an example of a "failure diagnosis apparatus of a hybrid vehicle" according to the invention. The ECU 100 is capable of executing an external electric power supply control described later according to a control program stored in the ROM.

The ECU 100 is an integral ECU that functions an example of a "controller" according to the invention. All operations related to the "controller" are executed by the ECU 100. However, the physical, mechanical, and electrical structures of the "controller" according to the invention are not limited thereto. For example, the "controller" may also be constituted as a plurality of ECUs, various process units, various controller, or various computer systems such as a microcomputer device and the like.

The hybrid drive device 10 is a drive unit. The hybrid drive device 10 supplies a drive torque to the axle of the hybrid vehicle 1. With this, the hybrid drive device 10 drives the hybrid vehicle 1. The detailed structure of the hybrid drive device 10 will be described later.

The PCU 20 is an ECU. The PCU 20 includes inverters 21 and 22. Each of the inverters 21 and 22 converts direct current electric power extracted from the battery 30 to alternating current electric power. Subsequently, each of the inverters 21 and 22 supplies the alternating current electric power obtained by the conversion to a motor generator MG1 and a motor generator MG2 described later. In addition, each of the inverters 21 and 22 converts the alternating current electric power generated by the motor generator MG1 and the motor generator MG 2 to the direct current, electric power. The alternating current electric power generated by the motor generator MG1 and the motor generator MG2 is an example of "generated electric power" according to the invention. Further, each of the inverters 21 and 22 is capable of supplying the direct current electric power obtained by the conversion to the battery 30. The PCU 20 includes an electric power supply line 23. The electric power supply line 23 includes a positive electrode bus and a negative electrode bus shared by the inverters. The electric power supply line 23 is also connected to the battery 30. The PCU 20 is capable of controlling inputting and outputting of electric power among the battery 30 and the individual motor generators. Alternatively, the PCU 20 is capable of controlling inputting and outputting of the electric power between the individual motor generators. In this case, the exchange of the electric power is performed between the individual motor generators without the intervention of the battery 30. The PCU 20 is electrically connected to the ECU 100. The operation of the PCU 20 is controlled by the ECU 100.

The battery 30 is a secondary battery unit. The battery 30 has a structure in which a plurality of unit battery cells are connected in series. The unit battery cell is a lithium-ion battery cell or the like. The number of unit battery cells is, e.g., several hundreds. The battery 30 supplies electric power for operating the motor generator MG1 and the motor generator MG2. That is, the battery 30 is an example of an "electric power storage device" according to the invention.

The AC converter 40 is an electric power conversion device. The AC converter 40 converts direct current electric power supplied from the battery 30 to alternating current electric power that can be supplied to household electrical appliances. The alternating current electric power that can be supplied to the household electrical appliances is, e.g., AC 100 V. The AC converter 40 is capable of supplying the alternating current electric power obtained by the conversion to the plug 50. The AC converter 40 is electrically connected to the PCU 20. Accordingly, the AC converter 40 is capable of converting alternating current electric power of each motor generator to the alternating current electric power mentioned above. Subsequently, the AC converter 40 is capable of supplying the alternating current electric power obtained by the conversion to the plug 50.

The plug 50 is a socket unit (plug socket). The plug 50 is electrically connected to the AC converter 40. The plug 50 can be paired with the attachment plug of the household electrical appliance. During the external electric power supply control described later, electric power stored in the battery 30 is supplied to the electrical appliance connected via the plug 50. Alternatively, electric power generated by the motor generator MG1 is supplied to the electrical appliance connected via the plug 50. That is, the external electric power supply is implemented.

The MIL 60 is an LED indicator. The MIL 60 is disposed at a position that is visible from the driver's seat of the hybrid vehicle 1. An example of the position visible from the driver's seat of the hybrid vehicle 1 includes a position in a meter hood. The MIL 60 includes a plurality of LEDs and their drive circuits. The plurality of LEDs are associated with various failure diagnosis locations described later. When the failure at the corresponding location is detected by a failure diagnosis process, the MIL 60 turns on the LED according to a basic turning-on regulation described later. The drive circuit of the MIL 60 is electrically connected to the ECU 100. Turning-on of each LED constituting the MIL 60 is controlled by the ECU 100.

The emergency electric power supply switch 70 is an operation switch. The emergency electric power supply switch 70 is disposed at a position where the emergency electric power supply switch 70 can be operated from the driver's seat of the hybrid vehicle 1. An example of the position where the emergency electric power supply switch 70 can be operated from the driver's seat of the hybrid vehicle 1 includes a position in a console panel. The emergency electric power supply switch 70 is a switch configured to be operable by an operator such as the driver or the like in a specific case. An example of the specific case includes a case where the external electric power supply involving the operation of an engine 200 corresponds to emergency electric power supply having high urgency. The external electric power supply involving the operation of the engine 200 is, i.e., engine-operation-electric-power supply.

The emergency electric power supply switch 70 is electrically connected to the ECU 100. Accordingly, when the emergency electric power supply switch 70 is operated, the ECU 100 is capable of detecting the operation thereof as an emergency electric power supply request.

Next, a description will be given of the hybrid drive device 10. The hybrid drive device 10 includes the engine 200, a power dividing mechanism 300, an input shaft 400, a drive shaft 500, an MG2 reduction gear mechanism 600, the motor generator MG1, and the motor generator MG2. Hereinbelow, the motor generator MG1 is appropriately abbreviated as the "MG1". In addition, the motor generator MG2 is appropriately abbreviated as the "MG2".

Figure 2:
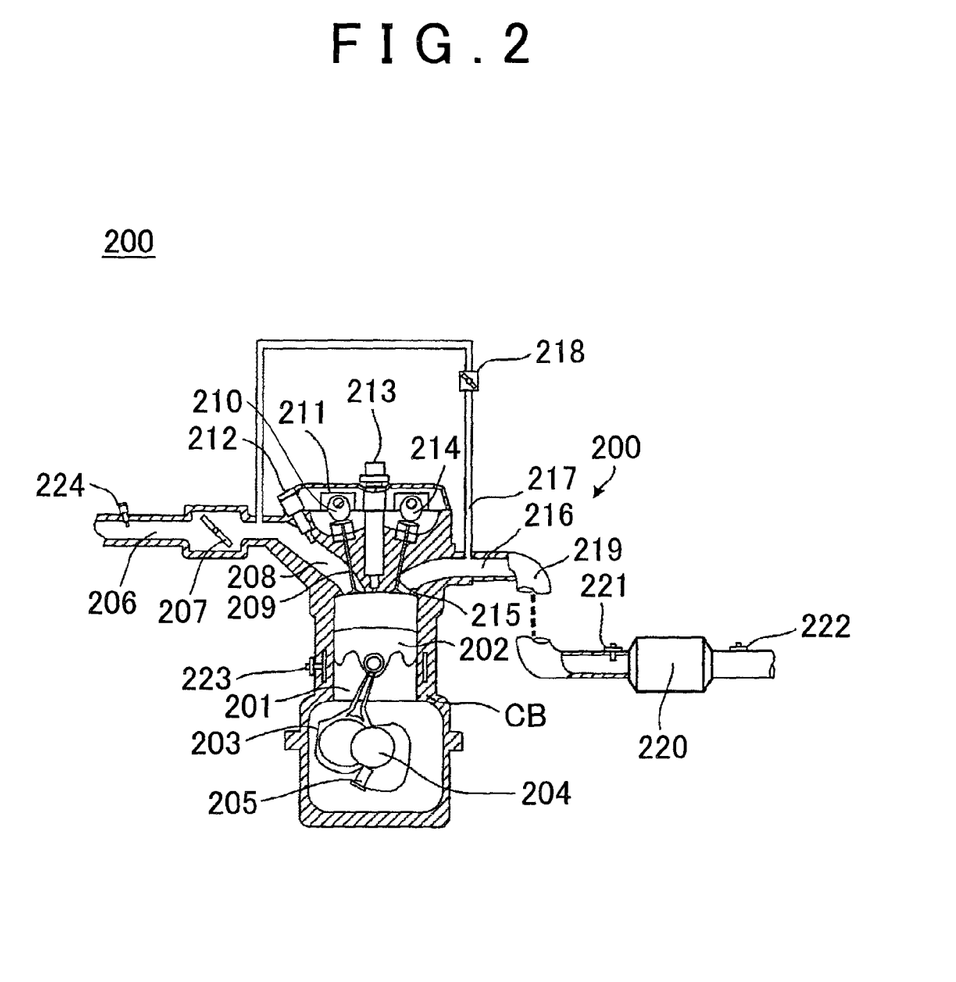
FIG. 2 is a schematic cross-sectional view of an engine in the hybrid vehicle of FIG. 1.

The engine 200 is an in-line four-cylinder gasoline engine. The engine 200 functions as a main power source for the hybrid vehicle 1. In addition, the engine 200 is an example of an "internal combustion engine" according to the invention. Herein, the engine 200 will be described in detail with reference to FIG. 2. FIG. 2 is a schematic cross-sectional view of the engine 200.

In FIG. 2, the engine 200 includes a plurality of cylinders 201. The plurality of cylinders are accommodated in a cylinder block CB. In FIG. 1, the cylinders 201 are arranged in a direction of depth relative to the plane of the paper. In addition, FIG. 2 shows only one cylinder 201.

The engine 200 has a piston 202 in a combustion chamber. The combustion chamber is formed in the cylinder 201. The piston 202 reciprocates in a vertical direction in the drawing in response to a explosive force caused by the combustion of an air-fuel mixture. The reciprocation of the piston 202 is converted to the rotational movement of a crankshaft 204 via a connecting rod 203. The rotational movement of the crankshaft 204 is utilized as the power for the vehicle on which the engine 200 is mounted.

A crank position sensor 205 is disposed in the vicinity of the crankshaft 204. The crank position sensor 205 is capable of detecting the rotational position of the crankshaft 204. The rotational position of the crankshaft 204 is, i.e., a crank angle. The crank position sensor 205 is electrically connected to the ECU 100. The detected crank angle is referred to by the ECU 100 at regular or irregular time intervals. For example, the detected crank angle is used in the calculation of an engine revolution per minute (RPM) NE or other controls.

In the engine 200, air taken in from the outside is purified by a cleaner (not shown). Thereafter, the air taken in from the outside is guided to an intake pipe 206 shared by the cylinders. The intake pipe 206 is provided with a throttle valve 207. The throttle valve 207 is capable of adjusting an intake air amount. The intake air amount is the amount of the air taken in from the outside. The throttle valve 207 is constituted as a type of an electronically controlled throttle valve. The driving state of the throttle valve 207 is controlled by a throttle valve motor (not shown). The throttle valve motor is electrically connected to the ECU 100. The ECU 100 controls the drive of the throttle valve motor. With this, the ECU 100 obtains a throttle opening corresponding to an accelerator depression amount Ta. The accelerator depression amount Ta is detected by an accelerator position sensor (not shown). Note that the ECU 100 is also capable of adjusting the throttle opening via the operation control of the throttle valve motor without the intervention of the intention of the driver.

The intake air is sucked into the cylinder via an intake port 208 when an intake valve 209 is opened. The amount of the intake air is appropriately adjusted by the throttle valve 207. The intake port 208 is provided in correspondence to each cylinder 201. The opening/closing timing of the intake valve 209 is determined according to a cam profile of a cam 210 (FIG. 2). The cam 210 has a substantially oblong cross-sectional shape. On the other hand, the cam 210 is fixed to an intake camshaft (its reference numeral is omitted) via a power transmission device. The power transmission device is a cam sprocket, a timing chain, or the like. The intake camshaft is coupled to the crankshaft 204. Accordingly, the opening/closing phase of the intake valve 209 has a unique relationship with the rotational phase of the crankshaft 204 in one fixation state. The rotational phase of the crankshaft 204 is, i.e., the crank angle.

The fixation state of the intake cam 210 to the intake camshaft is changed by the oil pressure of a control oil. The control oil is supplied by a hydraulic drive device 211. More specifically, the intake cam 210 is coupled to the intake camshaft via a vane-like member. The vane-like member is called a vane. The rotational phase between the vane and the intake camshaft is changed according to the oil pressure applied to a hydraulic chamber of the hydraulic drive device 211. Consequently, the rotational phase between the intake cam 210 fixed to the vane and the intake camshaft is also changed according to the oil pressure. The hydraulic drive device 211 is electrically connected to the ECU 100. The ECU 100 is capable of changing the opening/closing timing of the intake valve 209 through the control of the hydraulic drive device 211. Hereinafter, the variable valve timing mechanism is referred to as a "VVT" for the sake of convenience. The VVT mechanism includes the hydraulic drive device 211.

The mode that the VVT mechanism of this type can adopt is not limited to that of the embodiment. For example, the intake valve 209 may also be an electromagnetically driven valve. The electromagnetically driven valve is electromagnetically driven by a solenoid actuator or the like. The electromagnetically driven valve is, i.e., a cam by wire.

The intake air guided to the intake port 208 is mixed with port injection fuel. Subsequently, the intake air becomes the above-mentioned air-fuel mixture. The port injection fuel is injected from a PFI 212. The PFI 212 is a port fuel injector. In the PFI 212, a part of an injection valve is exposed to the intake port 208.

A part of a spark plug (its reference numeral is omitted) of an ignition device 213 is exposed in the combustion chamber of the engine 200. The ignition device 213 is a spark ignition device. The air-fuel mixture compressed in the compression stroke of the engine 200 is ignited by the ignition operation of the spark plug to be combusted. The ignition device 213 is electrically connected to the ECU 100. The ignition timing of the ignition device 213 is controlled by the ECU 100.

On the other hand, the air-fuel mixture combusted in the combustion chamber is discharged to an exhaust port 216 when an exhaust valve 215 is opened in the exhaust stroke following the combustion stroke. The exhaust valve 215 is opened and closed with the cam profile of an exhaust cam 214. The exhaust cam 214 is indirectly coupled to the crankshaft 204.

To the exhaust port 216, one end of an exhaust gas recirculation (EGR) pipe 217 is coupled. The other end of the EGR pipe 217 is coupled to an intake manifold (its reference numeral is omitted). The intake manifold is positioned on the upstream side of the intake port 208. With this, a part of exhaust gas can be returned to the intake system as EGR gas.

An EGR amount is controlled by an EGR valve 218. The EGR amount is the amount of the supplied EGR gas. The EGR valve 218 is disposed in the EGR pipe 217. The EGR valve 218 is an electromagnetically driven valve. The opening and closing of the EGR valve 218 are controlled with the electromagnetic force of a solenoid. The opening degree of the EGR valve 218 is controlled by the ECU 100. The ECU 100 is electrically connected to a drive device. The drive device controls the excitation state of the solenoid. In FIG. 1, the EGR pipe 217 is coupled to the exhaust port 216. However, the EGR pipe 217 may also be coupled to an exhaust manifold. The exhaust manifold collects the exhaust ports 216 of the plurality of the cylinders 201 on the downstream side of the exhaust ports 216. The exhaust manifold guides the exhaust gas to an exhaust pipe 219 described later.

In the embodiment, the EGR pipe 217 and the EGR valve 218 constitute a high pressure loop (HPL) EGR device. However, the structure of the EGR device is not limited thereto. For example, the EGR device may also be a low pressure loop (LPL) EGR device described later. The LPL-EGR device extracts the exhaust gas from the downstream side of a three-way catalyst 220. Hereinafter, as a comprehensive name for the EGR pipe 217 and the EGR valve 218, the "EGR device" is appropriately used.

The exhaust pipe 219 is coupled to the exhaust port 216 of each of the cylinders. The three-way catalyst 220 is disposed in the exhaust pipe 219. The three-way catalyst 220 is a conventional catalyst device in which a noble metal such as platinum or the like is carried by a catalyst carrier. The three-way catalyst 220 progresses the oxidation and combustion reaction of hydrocarbon (HC) and carbon monoxide (CO) and the reduction reaction of nitrogen oxides (NOx) substantially at the same time. With this, the three-way catalyst 220 is capable of purifying the exhaust gas.

An air-fuel ratio sensor 221 is disposed on the upstream side of the three-way catalyst 220 in the exhaust pipe 219. The air-fuel ratio sensor 221 is capable of detecting the air-fuel ratio of catalyst inflow gas flowing into the three-way catalyst 220. The air-fuel ratio sensor 221 is, e.g., a limiting current type wide range air-fuel ratio sensor having a diffusion resistance layer.

An $O_2$ sensor 222 is disposed on the downstream side of the three-way catalyst 220 in the exhaust pipe 219. The $O_2$ sensor 222 is capable of detecting the oxygen concentration of catalyst discharge gas that has passed through the three-way catalyst 220. The $O_2$ sensor 222 is a conventional electromotive force type oxygen concentration sensor. The conventional electromotive force type oxygen concentration sensor is a concentration cell type oxygen concentration sensor using stabilized zirconia.

In the engine 200, a water temperature sensor 223 is disposed in a water jacket. The water jacket is disposed so as to surround the cylinder block CB. The water temperature sensor 223 is capable of detecting a coolant temperature Tw. The coolant temperature Tw is the temperature of a coolant (LLC: long life coolant). The coolant is supplied so as to be circulated in order to cool the engine 200. The water temperature sensor 223 is electrically connected to the ECU 100. The coolant temperature Tw detected by the water temperature sensor 223 is referred to by the ECU 100 at regular or irregular time intervals.

In addition, an air flow meter 224 is disposed in the intake pipe 206. The air flow meter 224 is capable of detecting an intake air amount Ga. The air flow meter 224 is electrically connected to the ECU 100. The intake air amount Ga detected by the air flow meter 224 is referred to by the ECU 100 at regular or irregular time intervals.

The engine 200 is provided with a conventional idle speed control (ISC) device, a conventional purge device, and a conventional coolant circulation device. The ISC device controls a fuel supply amount during idling. The purge device recirculates vapor into an intake system. The vapor is fuel evaporated in a fuel tank. The coolant circulation device controls the temperature of the coolant. The ISC device, the purge device, and the coolant circulation device are omitted in FIG. 2 for the sake of brevity of the drawing. The ISC device, the purge device, and the coolant circulation device are also failure diagnosis targets in the failure diagnosis process described later.

A description will be given hereinbelow with reference to FIG. 1. The motor generator MG1 has a motoring function and a regeneration function. The motoring function is a function of converting electric energy to kinetic energy. The regeneration function is a function of converting the kinetic energy to the electric energy. The motor generator MG1 is an example of a "rotary electric machine" according to the invention.

The motor generator MG2 is larger than the motor generator MG1. Similarly to the motor generator MG1, the motor generator MG2 has the motoring function and the regeneration function. The motoring function is the function of converting the electric energy to the kinetic energy. The regeneration function is the function of converting the kinetic energy to the electric energy. The motor generators MG1 and MG2 are constituted as synchronous motor generators. For example, each of the motor generators MG1 and MG2 includes a rotor and a stator. The rotor mentioned herein has a plurality of permanent magnets on its outer peripheral surface. In addition, a three-phase coil that forms a revolving magnetic field is wound around the stator. The motor generators MG1 and MG2 may also have other structures. Note that the motor generator MG1 may be constituted to be capable of only electric power generation using the power of the engine 200 or may be constituted to be further capable of electric power generation using other powers that do not require the operation of the engine 200.

The power dividing mechanism 300 is a conventional planetary gear mechanism. The power dividing mechanism 300 includes a plurality of rotary elements that mutually perform differential operations.

The power dividing mechanism 300 includes a sun gear S1, a ring gear R1, a plurality of pinion gears (not shown), and a carrier C1. The sun gear S1 is provided at the central portion of the power dividing mechanism 300. The ring gear R1 is provided concentrically on the outer periphery of the sun gear S1. The plurality of pinion gears are disposed between the sun gear S1 and the ring gear R1. The pinion gears revolve about the outer periphery of the sun gear S1 while rotating. The carrier C1 supports the rotating shafts of the individual pinion gears.

The sun gear S1 is a reaction force element that bears a reaction force torque to an engine torque Te. The sun gear S1 is fixed to an output rotating shaft. To the output rotating shaft, the rotor of the motor generator MG1 is fixed. Consequently, the rotation speed of the sun gear S1 is equivalent to an MG1 rotation speed Nmg1. The MG1 rotation speed Nmg1 is the rotation speed of the motor generator MG1.

The ring gear R1 is an output element of the power dividing mechanism 300. The ring gear R1 is coupled to the drive shaft 500 such that its rotating shaft is shared. The drive shaft 500 is the power output shaft of the power dividing mechanism 300.

The carrier C1 is coupled to the input shaft 400 such that its rotating shaft is shared. The input shaft 400 is coupled to the crankshaft 204 of the engine 200 via a torsion damper TDP. The rotation speed of the carrier C1 is equivalent to the engine RPM NE of the engine 200.

The power dividing mechanism 300 having the above-described structure distributes the engine torque Te to the sun gear S1 and the ring gear R1 at a predetermined ratio by means of the carrier C1. The engine torque Te is supplied to the input shaft 400 from the engine 200. The predetermined ratio is a ratio corresponding to a gear ratio between the individual gears. With this, the power dividing mechanism 300 is capable of dividing the power of the engine 200 into two systems. In order to clarify the operation of the power dividing mechanism 300, a gear ratio ρ is defined. The gear ratio ρ is a ratio of the number of teeth of the sun gear S1 to the number of teeth of the ring gear R1. When the engine torque Te is applied to the carrier C1 from the engine 200, a torque Tes applied to the sun gear S1 is represented by the following expression (1). A direct torque Ter appearing on a ring gear shaft 700 is represented by the following expression (2).

$$Tes = -Te \times \rho/(1+\rho) \quad (1)$$

$$Ter = Te \times 1/(1+\rho) \quad (2)$$

The MG2 reduction gear mechanism 600 is a planetary gear mechanism having rotary elements. The rotary elements include a sun gear S2, a ring gear R2, a pinion gear (not shown), and a carrier C2. The MG2 reduction gear mechanism 600 is disposed between the drive shaft 500 and the motor generator MG2. The drive shaft 500 is coupled to the axle. In the MG2 reduction gear mechanism 500, the sun gear S2 is fixed to an output rotating shaft. The output rotating shaft is fixed to the rotor of the motor generator MG2. The carrier C2 is non-rotatably fixed to the outer case of the hybrid drive device 10. Further, the ring gear R2 is coupled to the drive shaft 500. In such a structure, the MG2 reduction gear mechanism 600 reduces a rotation speed Nmg2 of the motor generator MG2 according to a reduction gear ratio determined in accordance with the gear ratio of the individual rotary elements (gears). The MG2 reduction gear mechanism 600 is capable of transmitting the power of the motor generator MG2 to the drive shaft 500.

The structure of the MG2 reduction gear mechanism 600 is only one of modes that the mechanism for reducing the rotation of the motor generator MG2 can adopt. The reduction gear mechanism of this type can have various modes practically. In addition, the reduction gear mechanism of this type may not be provided in the hybrid drive device. That is, the motor generator MG2 may be directly connected to the drive shaft 500.

The hybrid vehicle 1 has various sensors in addition to the sensors shown in FIG. 2. The various sensors are omitted in FIG. 1. For example, the hybrid vehicle 1 includes an accelerator depression amount sensor. In addition, the hybrid vehicle 1 includes a vehicle speed sensor. The accelerator depression amount sensor is capable of detecting an accelerator depression amount Ta. The accelerator depression amount Ta corresponds to the operation amount of an accelerator pedal (not shown) of the hybrid vehicle 1. The accelerator depression amount sensor is electrically connected to the ECU 100. The accelerator depression amount Ta detected by the accelerator depression amount sensor is referred to by the ECU 100 at regular or irregular time intervals. In addition, the vehicle speed sensor is capable of detecting a vehicle speed V of the hybrid vehicle 1. The vehicle speed sensor is electrically connected to the ECU 100. The vehicle speed V detected by the vehicle speed sensor is referred to by the ECU 100 at regular or irregular time intervals.

Figure 3:
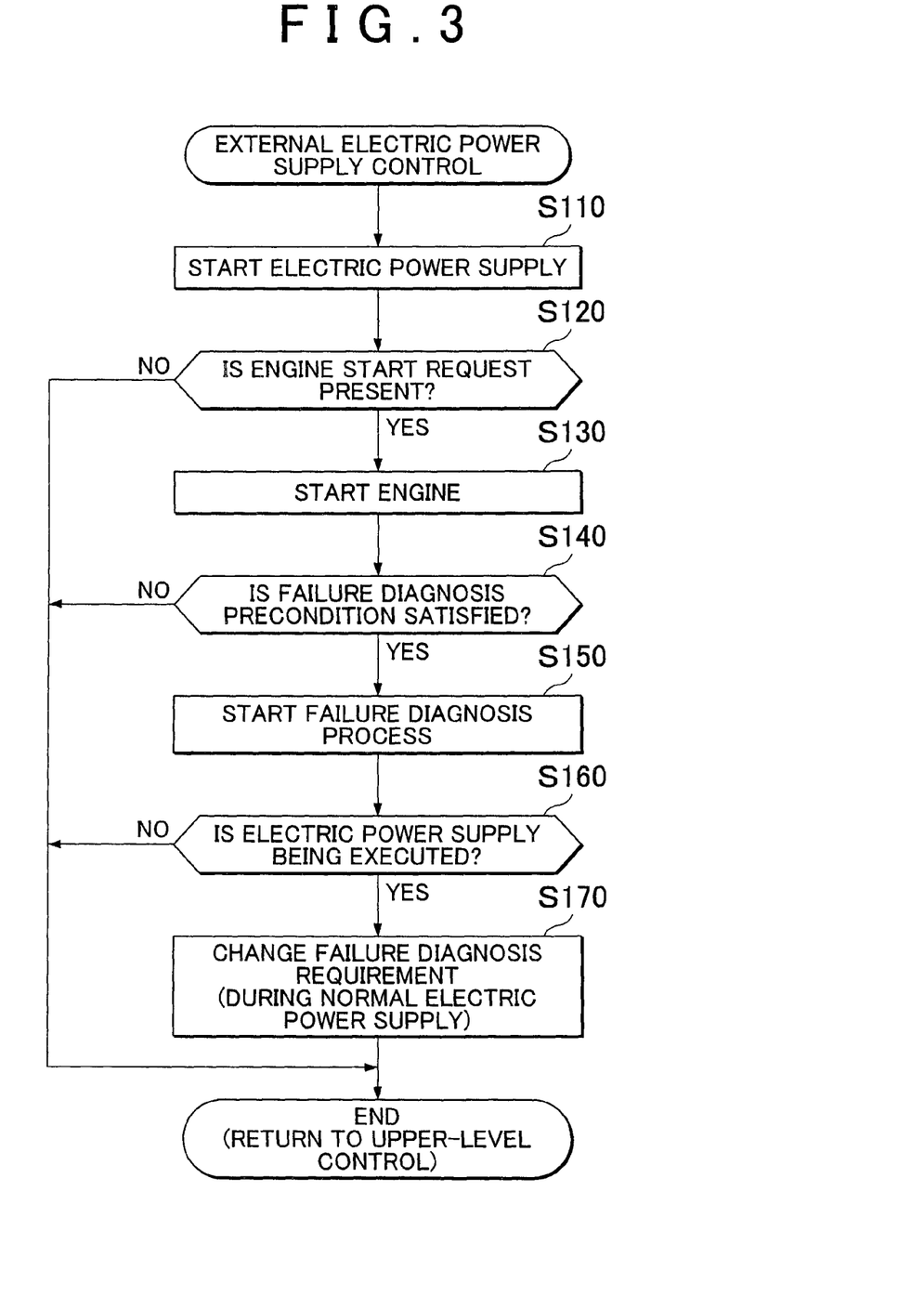
FIG. 3 is a flowchart of an external electric power supply control executed in the hybrid vehicle of FIG. 1.

Herein, a description will be given of the detail of the external electric power supply control as the operation of the embodiment with reference to FIG. 3. FIG. 3 is a flowchart of the external electric power supply control. The external electric power supply control is a sub-routine of a control executed by the ECU 100 at an upper level. The external electric power supply control is executed when the execution condition of the external electric power supply control is satisfied. The external electric power supply control is executed, e.g., in a case where a power receiving plug of power receiving equipment is inserted into the plug 50 when the hybrid vehicle 1 is stopped. An example of the power receiving equipment includes the above-mentioned household electrical appliance or the like.

In FIG. 3, the ECU 100 starts the electric power supply (Step S110). The electric power supply mentioned herein means, i.e., the external electric power supply. When the electric power supply is started, electric power stored in the battery 30 is used.

Next, the ECU 100 determines the presence or absence of an engine start request (Step S120). The engine start request is generated in a case where it is difficult to execute the adequate electric power supply with the electric power stored in the battery 30. That is, in a case where a request for relatively large or relatively long electric power supply that cannot be executed only with the electric power stored in the battery 30 is made, the engine start request is generated subsequent to the electric power supply with the electric power stored in the battery 30. An example of the case where it is difficult to execute the adequate electric power supply with the electric power stored in the battery 30 includes a case where the SOC of the battery 30 is lower than a predetermined value. Alternatively, the example thereof includes a case where the charging speed required by the power receiving equipment exceeds Wout (discharge limitation value) of the battery 30 or a case where the SOC of the battery 30 becomes lower than the predetermined value in the process of execution of the external electric power supply with the electric power stored in the battery 30. In the embodiment, all of these controls are controlled by the ECU 100. Consequently, the presence or absence of the engine start request is determined by the ECU 100 without delay. When the engine start request is absent (Step S120: NO), the ECU 100 ends the external electric power supply control. As described above, the external electric power supply control is the sub-routine. Therefore, when the execution condition is satisfied in the upper-level control, the processing is restarted from Step S110 at time intervals substantially equal to those of a loop control.

When the engine start request is present (Step S120: YES), the ECU 100 starts the engine 200 (Step S130). In the case where the engine 200 is started, the motor generator MG1 generates a cranking torque temporarily in its motoring state. However, after the engine 200 is started, by the operation of the power dividing mechanism 300 described above, the motor generator MG1 generates electric power with the reaction force torque of the engine torque Te. In and after Step S130, the electric power generated by the motor generator MG1 is supplied to the power receiving equipment. That is, when the external electric power supply is requested, the electric power generated by the motor generator MG1 by utilizing the power of the engine 200 is appropriately supplied to the power receiving equipment via the AC converter 40 and the plug 50.

When the engine 200 is started, engine-operation-electric-power supply is started. The engine-operation-electric-power supply means that the MG1 is caused to generate electric power with the supply of the power from the engine 200. When engine-operation-electric-power supply is started, the ECU 100 determines whether or not a failure diagnosis precondition is satisfied (Step S140). The failure diagnosis precondition is a precondition for the execution of the failure diagnosis process of the engine 200. The precondition is predetermined such that the failure diagnosis accuracy in the failure diagnosis process does not vary depending on the failure diagnosis process. The precondition is determined experimentally, empirically, or theoretically. In the embodiment, it is assumed that the failure diagnosis precondition is satisfied when the coolant temperature Tw of the engine 200 reaches a predetermined temperature. The predetermined temperature is, e.g., about 70° C. When the failure diagnosis precondition is not satisfied (Step S140: NO), the ECU 100 ends the external electric power supply control.

When the failure diagnosis precondition is satisfied (Step S140: YES), the ECU 100 starts the failure diagnosis process of the engine 200 (Step S150). When the failure diagnosis process is started, the ECU 100 determines whether or not the electric power supply is being executed (Step S160). When the electric power supply is not being executed (Step S160: NO), the ECU 100 ends the external electric power supply control. In this case, the execution condition of the external electric power supply is not satisfied back in the upper-level control. Consequently, the processing is not returned to Step S110, and another control is started.

When the electric power supply is being executed (Step S160: YES), the ECU 100 changes a failure diagnosis requirement in the failure diagnosis process (Step S170). The diagnosis requirement during the engine-operation-electric-power supply is made different from the diagnosis requirement when the engine is operated but engine-operation-electric-power supply is not executed (hereinafter also referred to as "during an engine-normal operation" appropriately) by changing the diagnosis requirement during the engine-operation-electric-power supply by means of the change device (the ECU 100 in this case). Consequently, the diagnosis requirement during the engine-operation-electric-power supply can be reliably made different from the diagnosis requirement during the engine-normal operation. In addition, the diagnosis requirement during the engine-operation-electric-power supply, which is determined in a restricted state is changed by the controller, and the reasonable diagnosis requirement having a small change frequency of the diagnosis requirement can be thereby set. When the failure diagnosis requirement is changed, the external electric power supply control is ended. In this case, the processing is returned to Step S110. Subsequently, the processing in and after Step S110 is repeatedly executed. That is, the failure diagnosis process based on the changed failure diagnosis requirement is executed concurrently with the external electric power supply using the electric power generated by the motor generator MG1.

Herein, a description will be given of the change of the failure diagnosis requirement according to Step S170. In the embodiment, the change of the failure diagnosis requirement includes the following four measures (1) to (4).

(1) A first measure (measure in which the execution frequency of the failure diagnosis process is reduced) (2) A second measure (measure in which a failure diagnosis criterion in the failure diagnosis process is relaxed) (3) A third measure (measure in which turning-on of the MIL is restricted) (4) A fourth measure (measure in which storage of a failure history is restricted)

The first measure is the measure in which the execution frequency of the failure diagnosis process is reduced. When the first measure is executed, the failure diagnosis process becomes less likely to be executed. Reducing the execution frequency of the failure diagnosis process specifically means delaying the start timing of the failure diagnosis process as compared with the start timing of the failure diagnosis process during the normal operation. Alternatively, reducing the execution frequency of the failure diagnosis process means reducing the process speed of the failure diagnosis process. The first measure includes a measure in which the execution of the failure diagnosis process is prohibited. Note that, when the execution of the failure diagnosis process is prohibited, the second to fourth measures are virtually unnecessary.

The second measure is the measure in which the failure diagnosis criterion is relaxed. With this, the diagnosis of the failure becomes less likely to be made. For example, a structure in which the failure diagnosis is performed through a comparison between a state amount indicative of the state of the failure diagnosis target and a threshold value is assumed to exist. In this structure, in a case where it is determined that the failure occurs when the state amount is not less than the threshold value, the measure in which the threshold value is increased is performed. In addition, in a case where it is determined that the failure occurs when the state amount is not more than the threshold value, the measure in which the threshold value is reduced is performed.

The process of the failure diagnosis process differs depending on the failure diagnosis target. Consequently, the practical mode of relaxation of the failure diagnosis criterion is not unique. In addition, the process is a conventional process.

However, a process slightly different from the normal failure diagnosis process can be performed depending on a failure diagnosis element. For example, the failure diagnosis process related to a fuel cut (F/C) control is performed during the F/C control. However, in the case of the engine-operation-electric-power supply involving the start of the engine 200 during the external electric power supply, the power of the engine 200 is required. Therefore, the F/C condition is not satisfied. Accordingly, the engine 200 is motored by the motor generator MG1 only when the SOC of the battery 30 is high. With this, the opportunity for the failure diagnosis is secured.

In an abnormality diagnosis process of the ISC device, it is unlikely that the engine 200 is operated in an idle state during the electric power supply. However, the abnormality diagnosis process may appropriately be executed only when such a condition is satisfied.

By the first and second measures, the change of the diagnosis requirement according to the invention made such that "the failure of the internal combustion engine becomes less likely to be detected" is implemented.

Figure 4:
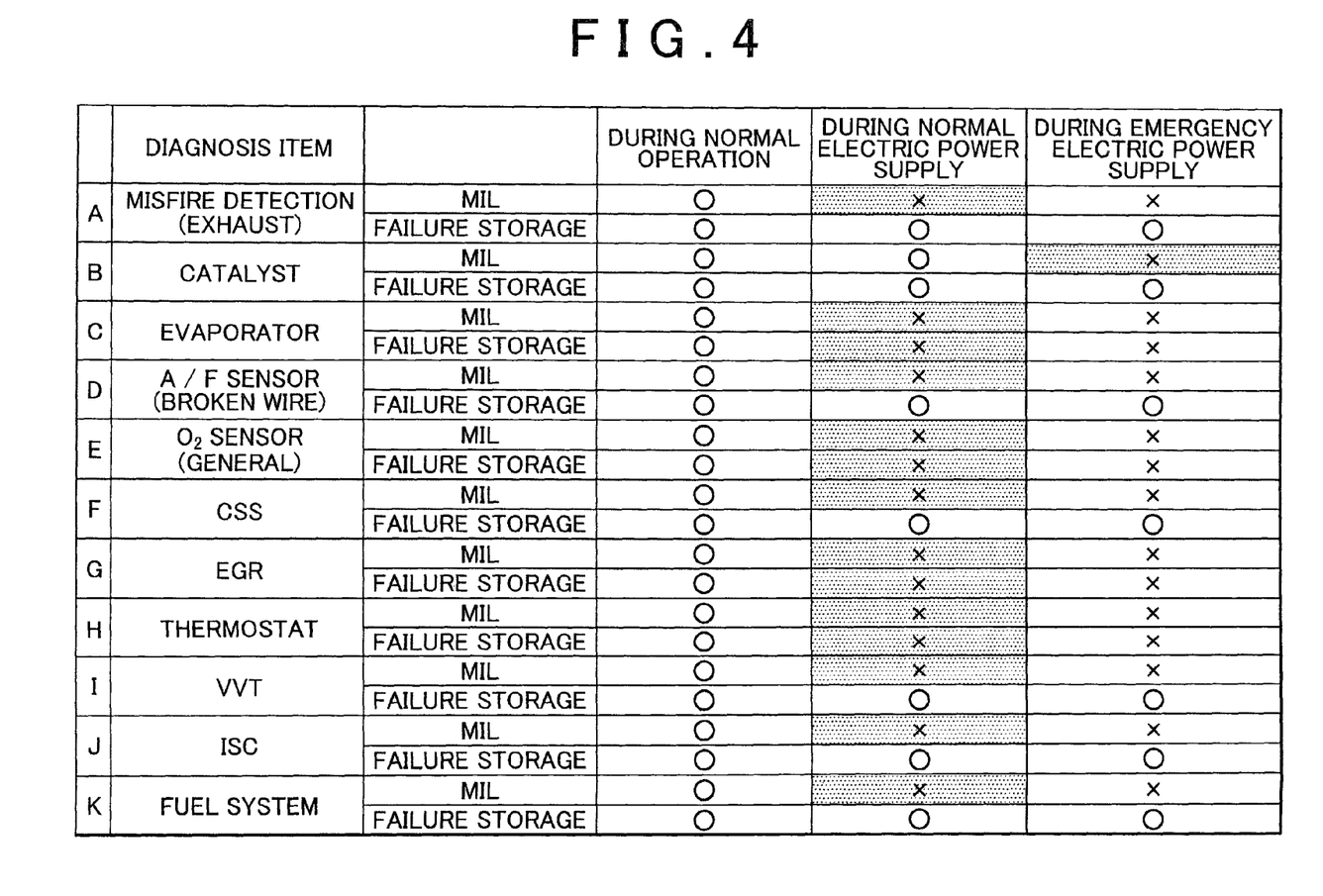
FIG. 4 is a table in which handling of failure diagnosis result of the engine in the hybrid vehicle of FIG. 1 is summarized on a per condition basis.

Herein, the third and fourth measures will be described with reference to FIG. 4. FIG. 4 is a table in which handling of the failure diagnosis result is summarized on a per condition basis.

FIG. 4 shows failure diagnosis items of the following items A to K in the failure diagnosis process according to the embodiment.

Item A: deterioration of an exhaust state due to a misfire
Item B: damage to the three-way catalyst 220

Item C: a failure of an evaporator supply line of the purge device

Item D: a broken wire of the air-fuel ratio sensor 221

Item E: a general failure of the O₂ sensor 222

Item F: catalyst warm-up (CSS)

Item G: a failure of the EGR device

Item H: a failure of the thermostat of the coolant circulation device

Item I: a failure of the VVT

Item J: a failure of the ISC device

Item K: a failure of the fuel system (the PFI 212)

The specific failure diagnosis process of each of these items is a conventional process. The failure diagnosis process is executed based on the diagnosis requirement as a comprehensive concept that includes various diagnosis criteria, diagnosis conditions, diagnosis methods, and handlings of the diagnosis results that can be set according to the failure diagnosis target. The failure diagnosis process is a comprehensive process that includes the detection of the failure, the determination of the failure location, the determination of the presence or absence of the failure, and the identification of degree of the failure. Herein, the specific handling of the failure diagnosis process will be described. That is, when the diagnosis of the failure is made as the result of the failure diagnosis process, the MIL 60 is turned on. In this case, the failure history is recorded in the RAM 130. The mode of turning-on of the MIL 60 is changed by the above third measure. In addition, the mode of the recording of the failure history in the RAM 130 is changed by the above fourth measure.

That is, basically, when the diagnosis of the failure is made during the normal operation, the corresponding LED of the MIL 60 is turned on. In FIG. 4, a mark indicates turning-on. Subsequently, the failure is recorded as the failure history. In FIG. 4, the mark o indicates the recording.

On the other hand, as shown in the drawing by hatching, during the normal engine-operation-electric-power supply, the turning-on of the MIL 60 is restricted in many failure diagnosis items. During the normal engine-operation-electric-power supply corresponds to "DURING NORMAL ELECTRIC POWER SUPPLY" in FIG. 4. In addition, many failure diagnosis items correspond to all items other than the diagnosis item B in FIG. 4. A mark x in FIG. 4 indicates that the turning-on of the MIL 60 is restricted. In addition, the recording of the failure history is not performed in many failure diagnosis items. The mark x in FIG. 4 indicates that the recording of the failure history is not performed. The following are main reasons for this.

That is, the state of the engine 200 during the engine-operation-electric-power supply is significantly different from the state of the engine 200 during the normal operation. For example, although the hybrid vehicle 1 is stopped, its requested load is changed. The requested load is requested electric power generated by the MG1. With the change of the requested load, the engine RPM NE is significantly changed. In addition, with the change of the requested load, the engine torque Te is also significantly changed. Consequently, the reliability of the failure diagnosis process tends to be lowered depending on the diagnosis item. In short, the diagnosis of the failure can be made in spite of the absence of the failure. The possibility that such an erroneous diagnosis occurs is high especially in the failure diagnosis process of the sensor system. Consequently, the diagnosis item having high possibility of the erroneous diagnosis is substantially neglected. An example of the diagnosis item having high possibility of the erroneous diagnosis includes the failure determination result related to the failure diagnosis item D or the failure diagnosis item E shown in FIG. 4. The failure diagnosis item D is related to the air-fuel ratio sensor 221. The failure diagnosis item E is related to the O₂ sensor 222.

When the electric power supply is prioritized during the external electric power supply, it is desirable to restrict the turning-on of the MIL 60 in the diagnosis item having a small influence on the electric power supply irrespective of the failure diagnosis accuracy. The diagnosis item having a small influence on the electric power supply includes the items A, C, F, G, H, I, J, and K in FIG. 4. If the MIL 60 is turned on, a driver sometimes voluntarily stops the electric power supply because of some anxiety. In addition, the driver sometimes stops the engine 200. Thus, from the viewpoint of preventing the suspension of the electric power supply, the turning-on of the MIL 60 is restricted.

The storage of the failure history is also restricted in many items. In FIG. 4, the storage of the failure history is restricted in each of the items C, E, G, and H. However, there is the item in which it is not desirable to leave the failure unrecorded even when the electric power supply is prioritized. Consequently, the number of items in which the storage of the failure history is restricted is smaller than the number of items in which the turning-on of the MIL 60 is restricted. For example, the broken wire of the A/F sensor 221 and the failures of the VVT, the ISC, and the fuel system are the failures that influence the normal operation of the engine. Therefore, these failure histories are stored.

By the third and fourth measures described above, the change of the diagnosis requirement according to the embodiments of the invention is implemented. The change of the diagnosis requirement is made "such that the failure of the internal combustion engine is less likely to be recognized by the driver".

With regard to the diagnosis item in which the external electric power supply does not influence the diagnosis accuracy while the electric power supply is prioritized, the recording of the failure history in the RAM 130 is permitted. The diagnosis item in which the external electric power supply does not influence the diagnosis accuracy is, i.e., the diagnosis item in which the result of the diagnosis of the failure has reliability. The failure detected in the diagnosis item in which the external electric power supply does not influence the diagnosis accuracy is a usual failure when the external electric power supply is ended. Accordingly, it is necessary to take a proper countermeasure against the failure. For example, the broken wire of the air-fuel ratio sensor 221 influences the operation during the normal operation. Therefore, the storage of the failure history of the broken wire of the air-fuel ratio sensor 221 in the RAM 130 is not restricted.

The result of the failure diagnosis of the three-way catalyst 220 (the item B) is not directly related to the electric power supply. However, the result of the failure diagnosis of the three-way catalyst 220 should be taken into consideration. This is for preventing an increase in emission or catalyst exhaust odor. Accordingly, when the abnormality is observed in the three-way catalyst 220 during the normal electric power supply, the turning-on of the MIL 60 and the recording of the failure history are permitted.

Even when the abnormality is observed in the three-way catalyst 220, the turning-on of the MIL 60 is restricted during the emergency electric power supply.

Herein, each of the "normal electric power supply" and the "emergency electric power supply" is the external electric power supply using the electric power generated by the motor generator MG1. There are various conditions under which the engine-operation-electric-power supply is required. For example, the engine-operation-electric-power supply is effective in daily use having low urgency and in emergency use having high urgency. Herein, when the engine-operation-electric-power supply corresponding to the latter, emergency use (i.e., the emergency electric power supply) is requested, there are cases where the failure diagnosis requirement can be further relaxed as compared with that in the engine-operation-electric-power supply corresponding to the former daily use because of high urgency. The use of the normal engine-operation-electric-power supply has low urgency. An example of the use having low urgency includes the electric power supply to the household electrical appliance or the like. The use of the emergency electric power supply has high urgency. An example of the use having high urgency includes the electric power supply in the event of a disaster or emergency. During the emergency electric power supply of FIG. 4, only a part having the handling different from that during the normal electric power supply is indicated by hatching. The item in which the same measure as that during the normal electric power supply is taken is not indicated by hatching.

Figure 5:
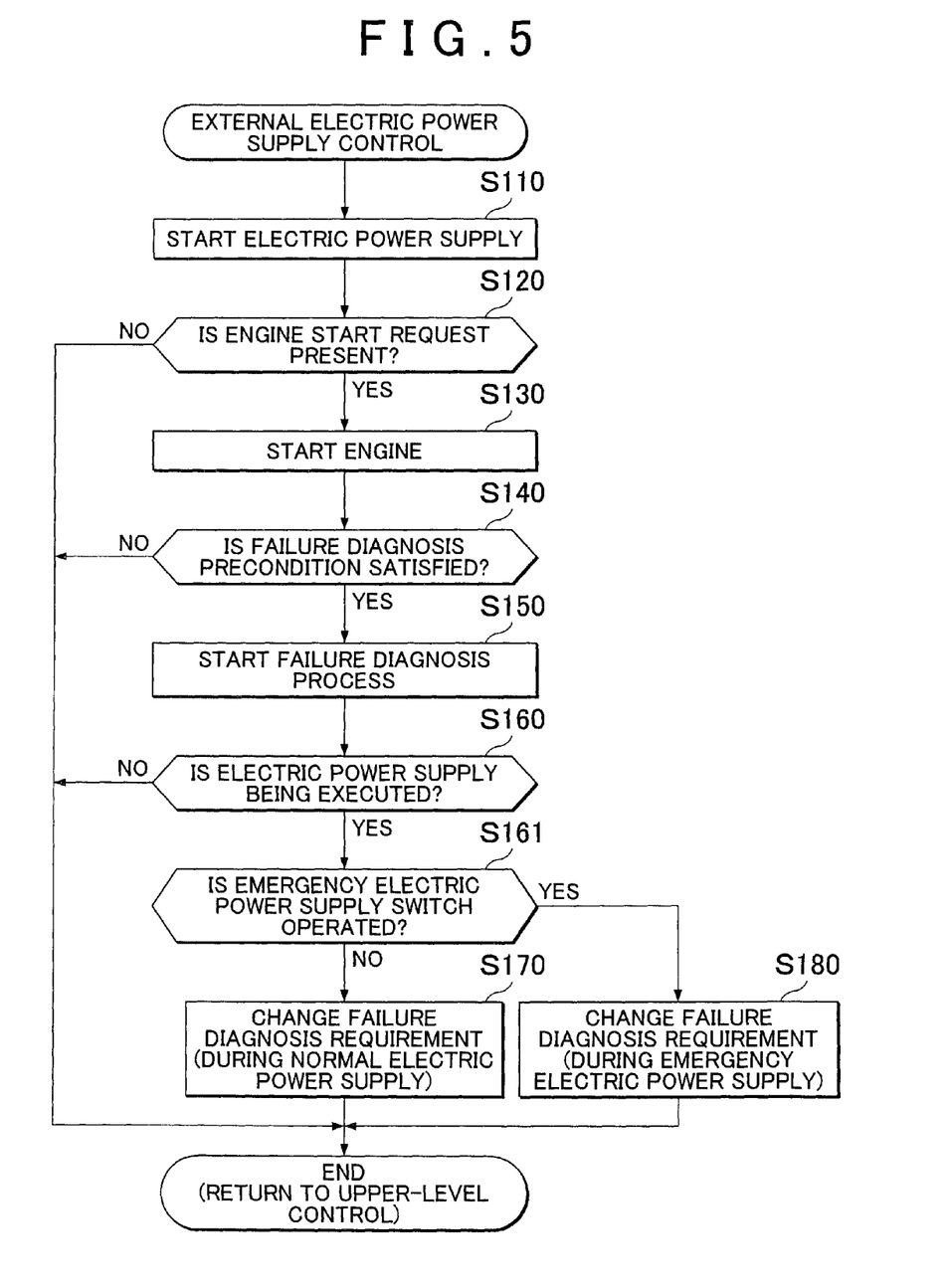
FIG. 5 is a flowchart according to a modification of the external electric power supply control of FIG. 3.

During the emergency electric power supply, there are cases where the electric power supply has precedence over the emission or the exhaust odor. An example of the case where the electric power supply has precedence thereover includes a case where lifesaving is performed. In such a case, it is desirable to restrict the turning-on of the MIL 60 to thereby refrain from giving an unnecessary mental load to the driver. The control during the emergency electric power supply is implemented by, e.g., extending the external electric power supply control in FIG. 3. Herein, a description will be given of the external electric power supply control in which the emergency electric power supply is taken into consideration with reference to FIG. 5. FIG. 5 is a flowchart according to a modification of that in FIG. 3. In FIG. 5, the parts that are the same as those in FIG. 3 are designated by the same reference numerals and the description thereof will be appropriately omitted.

A description will be given hereinbelow with reference to FIG. 5. When the ECU 100 performs the failure diagnosis process of the engine 200 during the engine-operation-electric-power supply (Step S160: YES), the ECU 100 determines whether or not the emergency electric power supply switch 70 is operated (Step S161). When the emergency electric power supply switch 70 is not operated (Step S161: NO), similarly to FIG. 3, the failure diagnosis process is executed according to the operational regulation during the normal electric power supply.

When the emergency electric power supply switch 70 is operated by an operator (Step S161: YES), the ECU 100 determines that the presently requested engine-operation-electric-power supply is the emergency electric power supply, and changes the failure diagnosis requirement to the requirement defined by "DURING EMERGENCY ELECTRIC POWER SUPPLY" of FIG. 4 (Step S180).

In view of the influence caused by relaxing the failure diagnosis requirement of the engine 200, the emergency electric power supply of this type is preferably structured such that the driver can make the request for the emergency electric power supply to the system based on his or her clear intention. For example, a structure may be adopted in which, when a switch, a button, or a lever that is operable by the driver is operated according to proper procedures, the system recognizes that the emergency electric power supply is requested.

With the structure described above, it is possible to change the failure diagnosis requirement more flexibly. In addition, it is possible to make the most of the engine 200 in the external electric power supply. Further, it is possible to achieve preferable cooperation between the failure diagnosis of the engine 200 and the engine-operation-electric-power supply.

Thus, the diagnosis requirement used when the engine-operation-electric-power supply involving the start of the engine 200 is executed (hereinafter occasionally referred to "during the engine-operation-electric-power supply" appropriately) is different from the diagnosis requirement used during the engine normal operation. More specifically, the diagnosis requirement used during the engine-operation-electric-power supply is made different from the diagnosis requirement used during the engine normal operation such that the failure of the engine 200 is less likely to be detected or the failure of the internal combustion engine is less likely to be recognized by the driver than during the engine normal operation. The difference in the diagnosis requirement may include both.

That is, according to the embodiments of invention, the diagnosis requirement used during, the engine-operation-electric power supply in which the engine is operated in a state different from that during the engine normal operation, is relaxed as compared with that during the engine normal operation. As a result, it is possible to avert the erroneous diagnosis that can be caused by application of the diagnosis requirement that is not specialized for the engine-operation-electric-power supply. Alternatively, even when the erroneous diagnosis is caused, the erroneous diagnosis becomes less likely to be recognized by the driver.

Second Embodiment

Figure 6:
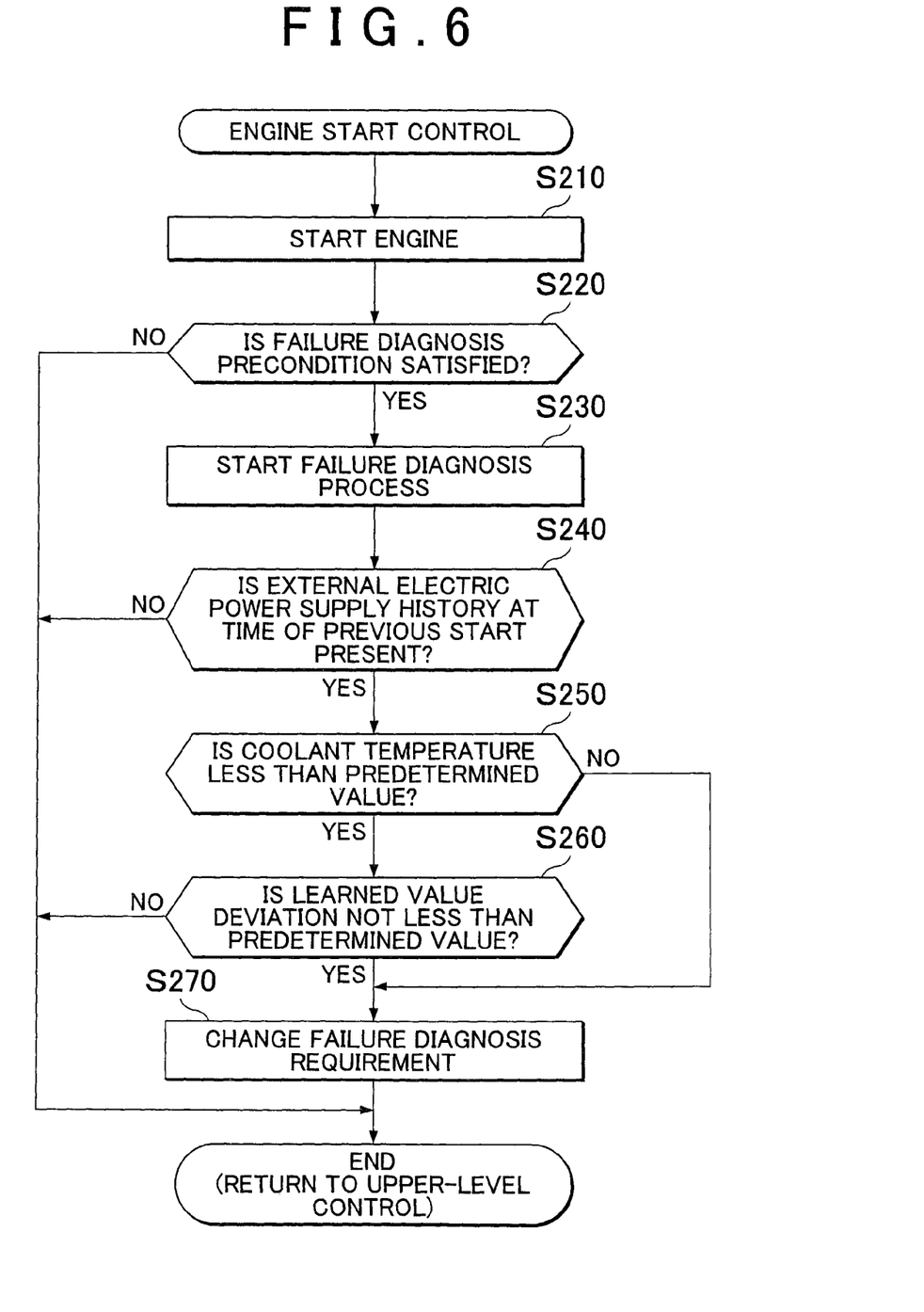
FIG. 6 is a flowchart of an engine start control according to a second embodiment of the invention.

Next, a description will be given of an engine start control as a second embodiment of the invention with reference to FIG. 6. FIG. 6 is a flowchart of the engine start control. Similarly to the external electric power supply control, the engine start control is a sub-routine. The engine start control is executed when the start of the engine 200 is requested through an ignition operation or a start button operation. This start request is different from the start request in the external electric power supply.

A description will be given hereinbelow with reference to FIG. 6. The ECU 100 starts the engine 200 (Step S210). Subsequently, it is determined whether or not the failure diagnosis precondition is satisfied (Step S220). It is determined whether or not the failure diagnosis precondition is satisfied by the same method as that in the external electric power supply control according to the first embodiment. When the failure diagnosis precondition is not satisfied (Step S220: NO), the engine start control is ended. However, similarly to the first embodiment, the engine start control is basically executed continuously until a stop measure is taken in the upper-level control. Consequently, the processing is executed form Step S210 again.

When the failure diagnosis precondition is satisfied (Step S220: YES), the ECU 100 starts the failure diagnosis process (Step S230). The failure diagnosis process itself is the same as that in the first embodiment. In addition, basically, the failure diagnosis process is not different from the failure diagnosis process of a related art.

When the failure diagnosis process is started, the ECU 100 determines whether or not the external electric power supply was performed at the time of the previous engine start based on external electric power supply history information (Step S240). Whether or not the external electric power supply was performed at the time of the previous engine start is, i.e., whether or not the previous engine start was the start for executing the engine-operation-electric-power supply. The external electric power supply history information is recorded in the RAM 130 every time the external electric power supply is executed. When the external electric power supply history is not present (Step S240: NO), the engine start control is ended. When the external electric power supply history is not present means, i.e., when the previous engine start was the normal engine start (ready-on start) that was executed by the start operation of the driver or executed in the course of the operation control of the hybrid vehicle 1.

On the other hand, when the external electric power supply history at the time of the previous start is present (Step S240: YES), the ECU 100 determines whether or not the coolant temperature Tw is less than a predetermined value (Step S250). When the coolant temperature Tw is not less than the predetermined value (Step S250: NO), the ECU 100 changes the failure diagnosis requirement (Step S270). This operation is the same as that in the first embodiment. On the other hand, when the coolant temperature Tw is less than the predetermined value (Step S250: YES), the ECU 100 further acquires learned values in conventional various learning processes. The various learning processes are executed in the engine 200. Examples of the learned value include a main F/B learned value and a sub F/B learned value of an air-fuel ratio F/B control, a purge amount learned value of the purge device, and the like. In the air-fuel ratio F/B control, the air-fuel ratio sensor 221 and the O$_2$ sensor 222 are used. Subsequently, the ECU 100 determines whether or not a deviation between the learned value at the time of the start without the external electric power supply history and the present learned value is not less than a predetermined value (Step S260). When the deviation is not less than the predetermined value (Step S260: YES), the ECU 100 changes the failure diagnosis requirement (Step S270).

On the other hand, when the deviation is less than the predetermined value (Step S260: NO), the ECU 100 does not change the failure diagnosis requirement. That is, the ECU 100 selects the failure diagnosis requirement during the normal operation. Subsequently, the ECU 100 ends the engine start control. In other words, when the deviation is less than the predetermined value, the deviation is a value corresponding to the cold state of the engine 200. In this case, the ECU 100 prohibits the change of the failure diagnosis requirement. As a result, the failure diagnosis process based on the failure diagnosis requirement during the normal operation is executed. This corresponds to the items of "DURING NORMAL OPERATION" of FIG. 4.

According to the engine start control according to the embodiment, when the external electric power supply is performed at the time of the previous start, the failure diagnosis requirement is basically changed. When the external electric power supply is performed at the time of the previous start means, i.e., when the engine start is performed subsequently to the engine-operation-electric-power supply according to the invention. The failure diagnosis requirement of each portion of the engine 200 is changed according to the first to fourth measures described above such that the failure becomes less likely to be detected. Alternatively, the failure diagnosis requirement of each portion of the engine 200 is changed such that the failure becomes less likely to be recognized by the driver. This is because there is a high possibility that the state of the engine 200 is not returned to the state during the normal operation due to the influence by the previous external electric power supply even at the engine start that does not involve the electric power supply. Specifically, at the time of the normal start, i.e., at the time of the ready-on start involving the ignition operation or the start operation, in a case where the engine-operation-electric-power supply was executed when the engine was not sufficiently cooled, there is a possibility that the state of the engine is not returned to the normal state. When the failure diagnosis process based on the normal diagnosis requirement is executed in such a case, the erroneous diagnosis may be caused. If the coolant temperature Tw is not less than the predetermined value or the deviation of the learned value is large, it can be presumed that the state of the engine 200 is not returned to the state during the normal operation. The coolant temperature Tw of not less than the predetermined value indicates that the coolant is not completely cooled. In addition, the large deviation of the learned value indicates that the learning having low accuracy was performed.

In contrast to this, in a case where the engine is sufficiently cooled and the deviation of the learned value is not large, even when the engine start was performed by the previous external electric power supply, it can be considered that a soak time was sufficient. Consequently, it can be considered that the engine 200 is already returned to the state during the normal operation. On the other hand, in the engine 200, various learning controls that utilize various sensors such as, e.g., the air-fuel ratio sensor and the like are performed. Herein, the convergence value of the learned value in the learning control in a case where the execution history of the engine-operation-electric-power supply is not present is effective as an index for determining whether or not the present engine state is the normal engine state. That is, if the difference between the learned values is not large in the cold state, even when the engine-operation-electric-power supply was executed at the time of the previous engine start, it can be considered that the engine is already returned to the normal state. Accordingly, in such a case, it is possible to execute the normal failure diagnosis control with no problem. Therefore, in this case, the normal failure diagnosis requirement is applied. As a result, the failure diagnosis of the engine 200 is properly executed.

The invention is not limited to the embodiments described above. In addition, the invention can be variously modified within the gist or thought of the invention that can be understood from the claims and the entire specification. The failure diagnosis apparatus of the hybrid vehicle involving such a modification is also included in the technical scope of the invention.

The invention can be applied to the failure diagnosis of the hybrid vehicle capable of the external electric power supply.

The invention claimed is:

1. A failure diagnosis apparatus of a hybrid vehicle including an internal combustion engine, a rotary electric machine that generates electric power by using power of the internal combustion engine, an electric power storage device, and an electric power supply device that supplies the electric power generated by the rotary electric machine and electric power stored in the electric power storage device to power receiving equipment outside the vehicle, the failure diagnosis apparatus comprising:

a controller that is configured to execute a first failure diagnosis process of the internal combustion engine based on a first diagnosis requirement in a case where engine-operation-electric-power supply is executed in which the internal combustion engine is operated to cause the rotary electric machine to generate electric power and the generated electric power is supplied to the power receiving equipment via the electric power supply device, the controller being configured to execute a second failure diagnosis process of the internal combustion engine based on a second diagnosis requirement in a case where engine-normal-operation is executed in which the internal combustion engine is operated and the rotary electric machine does not generate the electric power to be supplied to the power receiving equipment, wherein a failure of the internal combustion engine in the first failure diagnosis process of the internal combustion engine is less likely to be detected or the failure of the internal combustion engine in the first failure diagnosis process of the internal combustion engine is less likely to be recognized by a driver than the failure of the internal combustion engine in the second failure diagnosis process of the internal combustion engine.

2. The failure diagnosis apparatus of a hybrid vehicle according to claim 1, wherein the controller is configured to select the first diagnosis requirement at a time that the engine-operation-electric-power supply is being executed.

3. The failure diagnosis apparatus of a hybrid vehicle according to claim 2, wherein in a case where emergency electric power supply is requested at a time that the engine-operation-electric-power supply is being executed, the controller is configured to select the first diagnosis requirement such that the failure of the internal combustion engine is less likely to be detected or the failure of the internal combustion engine is less likely to be recognized by the driver than in a case where the emergency electric power supply is not requested.

4. The failure diagnosis apparatus of a hybrid vehicle according to claim 2 wherein the controller is configured to determine presence or absence of an execution history of the engine-operation-electric-power supply, wherein in a case where the execution history is present at a time that the second failure diagnosis process is executed at the time of the engine-normal-operation, the controller is configured to select the first diagnosis requirement such that the failure of the internal combustion engine is less likely to be detected or the failure of the internal combustion engine is less likely to be recognized by the driver than in a case where the execution history is absent.

5. The failure diagnosis apparatus of a hybrid vehicle according to claim 4 wherein the controller is configured to acquire a state value indicative of a warm-up state of the internal combustion engine, the controller is configured to acquire a learned value related to a learning process for learning a state of the internal combustion engine; and the controller is configured to prohibit the selection of the first diagnosis requirement based on the state value and the learned value in the case where the execution history is present.

6. The failure diagnosis apparatus of a hybrid vehicle according to claim 5, wherein the controller is configured to prohibit the selection of the first diagnosis requirement in a case where the state value is a value corresponding to a cold state of the internal combustion engine and a difference between the learned value in the case where the execution history is absent and the acquired learned value is not more than a predetermined value.

7. The failure diagnosis apparatus of a hybrid vehicle according to claim 2, wherein the controller is configured to execute at least one of a first measure in which an execution frequency of the failure diagnosis process is reduced, a second measure in which a determination criterion for determining whether or not the internal combustion engine has the failure is relaxed, a third measure in which notification of detection of the failure of the internal combustion engine to the driver is restricted, and a fourth measure in which storage of a history of the detection of the failure of the internal combustion engine is restricted.

* * * * *